(12) United States Patent
Schwerdt et al.

(10) Patent No.: US 11,673,102 B2
(45) Date of Patent: Jun. 13, 2023

(54) APPARATUS AND ARRANGEMENT FOR INTRODUCING A GAS INTO A MAIN MEDIUM IN PARTICULAR IN WASTE WATER TREATMENT

(71) Applicant: L'Air Liquide, Société Anonyme pour l'Etude et l'Exploitation des Procédés Georges Claude, Paris (FR)

(72) Inventors: Joerg Schwerdt, Kaarst (DE); Jan Mante, Münster (DE)

(73) Assignee: L'Air Liquide, Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 261 days.

(21) Appl. No.: 17/042,378

(22) PCT Filed: Mar. 19, 2019

(86) PCT No.: PCT/EP2019/056825
§ 371 (c)(1),
(2) Date: Sep. 28, 2020

(87) PCT Pub. No.: WO2019/185400
PCT Pub. Date: Oct. 3, 2019

(65) Prior Publication Data
US 2021/0031153 A1 Feb. 4, 2021

(30) Foreign Application Priority Data
Mar. 28, 2018 (EP) ..................................... 18164592

(51) Int. Cl.
*B01F 23/23* (2022.01)
*B01F 23/232* (2022.01)
(Continued)

(52) U.S. Cl.
CPC ...... *B01F 23/23231* (2022.01); *B01F 23/454* (2022.01); *B01F 25/211* (2022.01);
(Continued)

(58) Field of Classification Search
None
See application file for complete search history.

(56) References Cited

U.S. PATENT DOCUMENTS 3,936,382 A * 2/1976 White ............... B01F 25/31425
261/76
2010/0137670 A1 6/2010 Heinritz-Adrian et al.
(Continued)

FOREIGN PATENT DOCUMENTS

CA 2 143 362 9/1995
CN 102172484 9/2011
(Continued)

OTHER PUBLICATIONS

International Search Report and Written Opinion for corresponding PCT/EP2019/056825, dated Sep. 25, 2018.

*Primary Examiner* — Chester T Barry
(74) *Attorney, Agent, or Firm* — Yan Jiang

(57) ABSTRACT

Apparatus for introducing a gas into a main medium, comprising: a main conduit for guiding the main medium, a multitude of injection lines for guiding the gas, wherein each of the injection lines has a respective end section with a respective outlet opening situated within the main conduit, and wherein the end sections are oriented essentially parallel to each other and to the main conduit. With the apparatus a gas can be introduced in particular into waste water for obtaining a biologically activated sludge. Thereby, interaction between the gas and the waste water can be particularly pronounced due to a particularly large liquid-gas-interface caused by particularly extensive turbulences. Further, shear stress acting on particles in the activated sludge can be (Continued)

advantageously low, thus avoiding damage of the biological particles.

18 Claims, 3 Drawing Sheets

(51) Int. Cl.
    *C02F 1/74*     (2023.01)
    *C02F 3/12*     (2023.01)
    *C02F 3/22*     (2023.01)
    *B01F 23/454*     (2022.01)
    *B01F 25/53*     (2022.01)
    *B01F 25/21*     (2022.01)
    *B01F 25/313*     (2022.01)
    *B01F 23/237*     (2022.01)
    *B01F 101/00*     (2022.01)

(52) U.S. Cl.
    CPC .... *B01F 25/3131* (2022.01); *B01F 25/31322* (2022.01); *B01F 25/53* (2022.01); *C02F 1/74* (2013.01); *C02F 3/1284* (2013.01); *C02F 3/22* (2013.01); *B01F 23/23762* (2022.01); *B01F 23/23765* (2022.01); *B01F 23/237611* (2022.01); *B01F 23/237612* (2022.01); *B01F 23/237613* (2022.01); *B01F 2101/305* (2022.01); *C02F 2301/046* (2013.01)

(56) References Cited

U.S. PATENT DOCUMENTS

2011/0240753 A1\* 10/2011 Stevenson ............... B01F 25/72
                                                                         239/8
2013/0213883 A1\* 8/2013 Josse ....................... C02F 3/302
                                                                           210/601

FOREIGN PATENT DOCUMENTS

| DE | 31 21 532 | 5/1982 |
| DE | 10 2006 054415 | 5/2008 |
| DE | 10 2010 029388 | 12/2011 |
| EP | 2 796 188 | 10/2014 |
| GB | 2 077 127 | 6/1984 |
| JP | 2012 187576 | 10/2012 |
| TW | 274058 B | 2/1984 |
| TW | 2003 03784 | 9/2003 |
| WO | WO 2014 174154 | 10/2014 |

\* cited by examiner

APPARATUS AND ARRANGEMENT FOR INTRODUCING A GAS INTO A MAIN MEDIUM IN PARTICULAR IN WASTE WATER TREATMENT

CROSS REFERENCE TO RELATED APPLICATIONS

This application is a 371 of International Application No. PCT/EP2019/056825, filed Mar. 19, 2019, which claims priority to European Patent Application No. 18164592.0, filed Mar. 28, 2018, the entire contents of which are incorporated herein by reference.

BACKGROUND

The present invention is directed to an apparatus and an arrangement for introducing a gas into a main medium, in particular in waste water treatment.

Waste water can be treated in particular by means of the so called activated sludge process. Therein, a gas such as air is introduced into the waste water. This is usually done in an aeration tank. Due to biological particles such as bacteria or including bacteria added to and/or already contained in the waste water, an activated sludge is obtained. The biological particles interact with the waste water biologically. Finally, the waste water and/or the activated sludge is commonly transferred to a settling tank, wherein the biological particles can be removed from the treated water.

In activated sludge treatment, it is preferred that interaction between the waste water and the gas introduced thereinto is particularly high. However, a high interaction between the gas and the waste water is likely to damage the biological particles within the activated sludge. In particular, shear stress can act upon the particles when the gas is introduced. To ensure that the biological particles in the waste water remain intact, particularly low shear stress acting upon the particles is preferred.

In known realizations of the activated sludge process the interaction between the gas and the waste water is insufficiently low and/or the shear stress acting upon the particles is unacceptably high.

SUMMARY

It is, therefore, an object of the present invention to overcome at least in part the disadvantages known from prior art and, in particular, to provide an apparatus and an arrangement for introducing a gas into a main medium, wherein an interaction between the gas and liquid components of the main medium is particularly high and/or wherein shear stress acting upon particles contained within the main medium are particularly low.

These objects are solved by the features of the independent claims. Dependent claims are directed to preferred embodiments of the present invention.

An apparatus for introducing a gas into a main medium is provided that comprises:
  a main conduit for guiding the main medium,
  a multitude of injection lines for guiding the gas.

Each of the injection lines has a respective end section with a respective outlet opening situated within the main conduit. The end sections are oriented essentially parallel to each other and to the main conduit.

The described apparatus may be used to introduce any gas into any main medium. The apparatus is preferably configured for a main medium that comprises a liquid component and, optionally, also particles as a solid component. In case that the main medium comprises a liquid component and particles the main medium is a suspension.

The described apparatus may be used in particular in waste water treatment, in particular in the context of an activated sludge process. Therein, a gas such as air, oxygen, ozone or the like may be introduced into waste water and/or activated sludge as the main medium. Activated sludge as used herein is a suspension of waste water and biological particles. That is, waste water is a liquid component and the biological particles are a solid component of the suspension. The particles may be in particular biological particles in activated sludge as a suspension. The particles that may be referred to as flocks may be formed of microorganisms being necessary for the conversion of specific ingredients of the waste water. The waste water may also comprise further solid components such as waste particle. For simplicity, herein it is only distinguished between solid biological particles such as flocks and liquid waste water, disregarding these further solid particles. To maintain the activity in this activated sludge gas is introduced into the system. Since this is a continuous process, gas may also be introduced into a substance that may already be considered an activated sludge, wherein an activated sludge with an increased amount of biological mass is obtained. This way, the gas may be introduced into the waste water and/or into the activated sludge in order to obtain activated sludge or to increase the amount of particles therein, respectively.

Although herein waste water treatment is particularly focused on, it should be noted that the invention is not limited to this field of technology. The described apparatus may be used in any context in which a gas is supposed to be introduced into a main medium. The main medium does not have to comprise a liquid and/or a solid phase.

The main medium may be guided through the main conduit of the apparatus. Via the main conduit preferably an apparatus inlet and an apparatus outlet are connected to each other. This way, the main medium may be let into the apparatus via the apparatus inlet, may be guided through the apparatus via the main conduit and may be let out of the apparatus via the apparatus outlet. In between the apparatus inlet and the apparatus outlet, preferably the gas may be introduced into the main medium. The main conduit is preferably a single direct connection between the apparatus inlet and the apparatus outlet. Alternatively, the main conduit may comprise multiple branches that partially or totally run in parallel or in series to each other. The main conduit is preferably realized within boundaries made of a metal such as steel. The boundaries may be tube-shaped. In particular, multiple elements such as tube elements, valve elements, chambers, flanges, seals and/or gaskets may be arranged in series and connected to each other in order to form the boundaries for the main conduit.

The gas may be introduced into the main medium via the injection lines, in particular via the outlet openings thereof. Those parts of the injection lines that are situated within the main conduit and that are oriented essentially parallel to the main conduit are considered the end section of the respective injection line. Each injection line preferably comprises a single outlet opening. Alternatively, some or all of the injection lines may comprise a multitude of outlet openings. The outlet opening is preferably situated at the end of the end section as seen in a flow direction of the gas. Preferably, the outlet opening is configured such that the gas may be ejected from the outlet opening in the direction of the end section. This is supposed to be understood such that the end sections and the mass center of the ejected gas and/or a center line of the conduit enclose an angle of less than 20 degrees with each other. It is preferred that this angle is less than 10 degrees, in particular less than 5 degrees.

Due to the arrangement of the injection lines within the main conduit the gas may be introduced into the main medium in a concurrent way. That is, the gas may be ejected from the injection lines in a direction that is essentially the same as the direction of the main medium. Although it is preferred that the main medium is guided through the apparatus in such a direction that the gas may be introduced into the main medium in such a concurrent way, from the construction of the apparatus it may also be possible that the main medium is guided through the apparatus in the other direction, wherein the gas would be introduced in a countercurrent way.

Preferably, the end sections and the main conduit are oriented parallel to the main conduit. However, the skilled person will appreciate that a small deviation from a mathematically exact parallel orientation will not have a significant technical effect. Thus, it is sufficient that the end sections and the main conduit are oriented essentially parallel to each other. This is supposed to be understood such that the end sections and the main conduit enclose an angle of less than 20 degrees with each other. It is preferred that this angle is less than 10 degrees, in particular less than 5 degrees. In case the angle is not constant, essentially parallel is supposed to be understood such that the maximum value of the angle is less than 20 degrees.

Preferably, the maximum value of the angle is less than 10 degrees, in particular less than 5 degrees.

Preferably, the main conduit and the injection lines have circular cross sections perpendicular to the main conduit. In that case at least the end sections of the injection lines have a smaller diameter than the main conduit such that the end sections of the injection lines may be contained within the main conduit. In case the cross sections of the main conduit and/or the injection lines are not circular, a respective definition of diameter is supposed to be applied.

The injection lines preferably penetrate the boundary of the main conduit such that the gas may be introduced into the injection lines from outside the main conduit. Therein, the boundary of the main conduit and the injection lines are preferably sealed such that main medium from the main conduit cannot exit the main conduit where the injection lines penetrate the boundary of the main conduit.

It has been discovered that with the described arrangement of the main conduit and the injection lines an interaction between the gas and a liquid component of the main medium is particularly high and/or that shear stresses acting upon particles contained within the main medium are particularly low. That is, a three-phase mixture containing the gas, the liquid component of the main medium and particles within the main medium may be obtained in a manner that is particularly advantageous in the above described activated sludge process in waste water treatment. Therein, mass transfer from the gas into the liquid component may be enhanced, while mechanical stress on activated sludge flocks is kept particularly low.

Due to the described arrangement it is possible to introduce the gas at a high speed and with a well-defined pattern of introduction. The pattern of introduction of the gas could also be considered a spray pattern. However, the expression pattern of introduction is used herein since the gas is preferably introduced into a mainly liquid main medium such as a suspension. The introduction of a gas into such a medium is usually not referred to as spraying.

It was found that turbulences may be particularly pronounced due to the pattern of introduction of the gas. Also, an interface between the gas and the liquid component of the main medium may be particularly large. This may be due to the formation of particularly small gas bubbles within the main medium. The turbulences and/or the large interface may allow a particularly intense interaction between the gas and the liquid component.

Since the turbulences and the large interface between the gas and the liquid component of the main medium are obtained due to the pattern of introduction of the gas into the main medium, shear stress action upon particles contained within the main medium may be particularly low. This is particularly true compared to approaches, wherein turbulences and an interface between the gas and the liquid component of the main medium are obtained due to acceleration of the mixture of the main medium and the gas, that is of a three-phase mixture containing the gas, the liquid component of the main medium and particles within the main medium.

Due to the fact that the turbulences and the large interface between the gas and the liquid component of the main medium are obtained due to the pattern of introduction of the gas into the main medium, also the energy required for pumping may be particularly low. This is also particularly true compared to approaches, wherein a three-phase mixture is accelerated. In contrast to such an approach, with the described apparatus merely the main medium has to be driven by a pump and the gas may be introduced into the main medium driven by gas pressure. Also, the gas may be sucked into the main medium by the flow of the main medium. With the described apparatus, the energy necessary for the generation of turbulences and boundaries between different phases may be introduced into the system by an adiabatic expansion of the gas while introducing the same into the main medium.

Therein, a pressure drop of the gas is preferably between 2 bar and 20 bar, in particular between 5 bar and 15 bar.

In the following, several preferred embodiments of the apparatus are described. The patterns of introduction of the gas obtained due to the respectively described preferred arrangements of the end sections of the injection lines were found to be particularly advantageous with respect to the discussed turbulences and/or interface between a liquid component of the main medium and particles contained therein.

In a preferred embodiment of the apparatus, in a cross section perpendicular to the main conduit, the end sections of the injection lines are arranged on concentric circles.

Concentric circles as used herein are circles that have a common center but different radii. In this embodiment the end sections are arranged on two or more concentric circles. Thereby, on each of the concentric circles the end sections of one or more injection lines may be arranged. Preferably, the end sections arranged on the same circle are equally distributed among the circle. It is possible that the inner circle has a diameter of zero. That is, one of the injection lines may be situated in the center of the concentric circles.

The circles may be merely imaginary and do not have to be explicitly visible. In case the end sections are arranged in parallel to each other the arrangement of the
end sections may also be described such that the end sections are situated on jacket surfaces of imaginary concentric cylinders.

In a further preferred embodiment of the apparatus one of the injection lines is an inner injection line and the remaining injection lines are outer injection lines, wherein the end sections of the outer injection lines are radially spaced apart from the end section of the inner injection line.

In a cross section perpendicular to the main section, the end section of the inner injection line is arranged in between the end sections of the outer injection lines such that the outer injection lines are spaced apart from the end section of the inner injection line in a radial manner. Therein, the radial direction is defined within the cross section perpendicular of the main conduit.

In the cross section perpendicular to the main conduit, the inner injection line is preferably arranged in a center of the main conduit. If the main conduit has a cylindrical shape, the inner injection line is thus preferably arranged on an axis of the main conduit.

In case the end sections of the injection lines are arranged on concentric circles as is the case with the previously described embodiment, the end section of the inner injection line is situated in the center of the concentric circles. That is, the inner circle has a diameter of zero. In this embodiment there is only one further circle in addition to this inner circle.

In a further preferred embodiment of the apparatus the end sections of the outer injection lines are equally spaced apart from each other in a circumferential direction.

The circumferential direction is defined within a cross section perpendicular to the main conduit. Equally spaced apart in the circumferential direction means that an angle between respective imaginary lines connecting the inner injection line with the outer injection lines is the same for all pairs of neighboring outer injection lines. These imaginary lines are contained within the cross section perpendicular to the main conduit. For example, if there are four outer injection lines, the angle between these imaginary lines is 90 degrees for all pairs of neighboring injection lines.

In a further preferred embodiment of the apparatus the outlet openings of the outer injection lines are arranged in a plane perpendicular to the main conduit.

In this embodiment the outlet openings of the outer injection lines are arranged in the same position in a direction along the main conduit.

In a further preferred embodiment of the apparatus the outlet opening of the inner injection line is arranged downstream of the outlet openings of the outer injection lines.

The expression downstream refers to the direction into which the gas may be ejected from the injection lines. Thus, in this embodiment the gas ejected from the outer injection lines passes at least a part of the end section of the inner injection line before it is joined by gas ejected from the inner introduction line. If the main medium is guided through the main conduit in a manner concurrent with the gas ejected from the injection lines, first the gas from the outer injection lines is introduced into the main medium and subsequently, also the gas from the inner injection line is introduced into the main medium.

This arrangement of the injection lines provides a conical pattern of introduction of the gas, wherein the gas ejected from the inner injection line provides a tip of the cone.

Such conical pattern of introduction of the gas may be enhanced by means of the shape of the main conduit. Therefore, a further embodiment of the apparatus is preferred, wherein the main conduit comprises a narrowing downstream of the outlet opening of all the injection lines.

As before, the expression downstream refers to the direction into which the gas may be ejected from the injection lines.

In a further preferred embodiment of the apparatus a respective nozzle tip is provided at the outlet opening of each injection line.

A nozzle tip is a separate element attached to the introduction line such that the gas may be ejected from the introduction line via the nozzle tip. The nozzle tip is preferably configured such that due to the shape of the nozzle tip the gas may be accelerated within the nozzle tip prior to ejection.

Further, by means of the nozzle tips the pattern of introduction of the gas may be adjusted. If the nozzle tips are configured in an exchangeable manner, different patterns of introduction of the gas may easily be realized by using different sets of nozzle tips.

According to a further aspect an arrangement for introducing a gas into a main medium is provided that comprises:
 a reservoir for the main medium,
 an apparatus configured as described,
 an ejector that is situated within the reservoir.

The apparatus is connected to the ejector in such a way that a mixture of the main medium and the gas obtained with the apparatus may be introduced into the reservoir via the ejector.

The details and advantages disclosed for the described apparatus may be applied to the arrangement, and vice versa.

Preferably, the apparatus is connected to the reservoir such that at least a part of the main medium may be guided from the reservoir to the apparatus. This way, the main medium may be extracted from the reservoir, may be guided to the described apparatus and may be reintroduced into the reservoir via the ejector.

Alternatively, the main medium may be extracted from a source other than the reservoir into which it is introduced by way of the ejector. For example, the main medium may be provided in a source tank, may be extracted therefrom, may be guided to the described apparatus and may be introduced into the reservoir via the ejector. Therein, the source tank and the reservoir are separate from each other.

Preferably, a first line is provided for extracting a part of the main medium from the reservoir or the source tank and for guiding this part of the main medium to an apparatus inlet of the described apparatus.

After the gas has been introduced into the main medium within the apparatus, the mixture of the main medium and the gas may be guided to the ejector via a second line that is connected to an apparatus outlet. The mixture of the main medium and the gas can, in particular, be a three-phase mixture for example in waste water treatment.

Preferably, at least one pump is provided in the first line and/or in the second line for driving the main medium and/or the mixture of the main medium and the gas introduced thereinto. In waste water treatment it is particularly preferred that the pump is included in the first line, that is upstream of the described apparatus. That way, merely the main medium has to be accelerated instead of the obtained three-phase mixture.

In waste water treatment the reservoir may be an aeration tank, in which the waste water is activated by introducing a gas such as air into it.

According to a preferred embodiment of the arrangement the ejector comprises:
 an ejector intake for sucking in main medium from the reservoir,
 an ejector inlet that is connected to an apparatus outlet of the apparatus, and
 a mixing chamber, connected to the ejector intake, the ejector inlet and an ejector outlet.

The ejector according to the present embodiment may be considered as being configured like a jet pump that is driven by the mixture of the main medium and the gas obtained using the described apparatus. This mixture may be introduced into the ejector via the ejector inlet. Preferably, this mixture is driven by at least one pump within the first line and/or the second line. By introducing the thus driven mixture into the ejector, the main medium contained within the reservoir may be sucked into the ejector. This is may be due to a negative pressure caused by the pump-driven mixture. The mixture obtained by the described apparatus and the main medium from the reservoir are mixed with each other in the mixing chamber after having been introduced and sucked into the ejector, respectively. After this mixing, the resulting substance may be reintroduced into the reservoir via the ejector outlet.

In a further preferred embodiment of the arrangement the reservoir is an aeration tank for treating waste water as the main medium.

The introduction into the reservoir as described above via the ejector may be particularly advantageous in waste water treatment, since the mixture obtained by the described apparatus may be mixed particularly well with the main medium in the reservoir. That is, downstream of the generation of a three-phase mixture in the described apparatus the three-phase-mixture is mixed with the waste water and/or the activated sludge in the reservoir by use of the ejector. The ejector thereby acts as a jet pump using the three-phase mixture from the described apparatus as a driving medium.

According to a further aspect a use of an apparatus configured as described is provided, wherein the main medium is a suspension.

The details and advantages disclosed for the described apparatus and arrangement may be applied to the described use, and vice versa.

It is preferred that the gas is introduced into the main medium in a concurrent way.

In a preferred embodiment of the use the main medium is waste water and/or activated sludge.

As discussed above, introducing gas into waste water is a continuous process, Thus, gas may be introduced into waste water or into a substance that may already be considered activated sludge, wherein an activated sludge with an increased amount of biological mass is obtained from the further introduction of the gas.

In a further preferred embodiment of the use the gas comprises at least one of the following: air, oxygen, carbon dioxide, nitrogen, ozone.

These gases are particularly suitable to obtain activated sludge in waste water treatment. Using air is particularly preferred since air is particularly available.

BRIEF DESCRIPTION OF THE DRAWINGS

It should be noted that the individual features specified in the claims may be combined with one another in any desired technologically reasonable manner and form further embodiments of the invention. The specification, in particular taken together with the figures, explains the invention further and specifies particularly preferred embodiments of the invention. Particularly preferred variants of the invention and the technical field will now be explained in more detail with reference to the enclosed figures. It should be noted that the exemplary embodiment shown in the figures is not intended to restrict the invention. The figures are schematic and may not be to scale. The figures display:

DETAILED DESCRIPTION OF PREFERRED EMBODIMENTS

Figure 1:
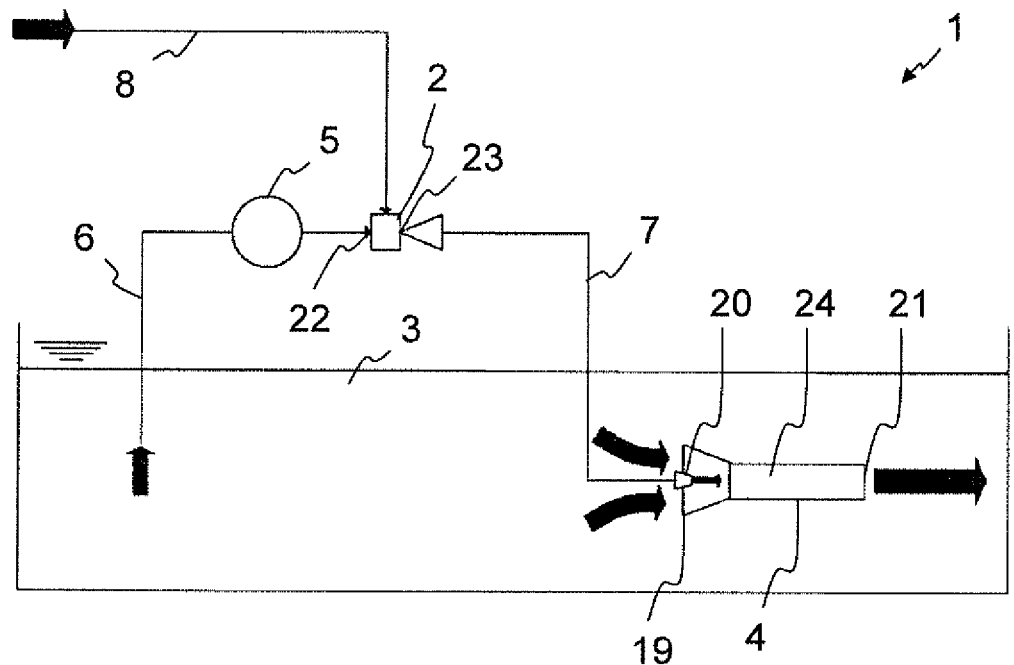
FIG. 1 is a schematic depiction of an arrangement for introducing gas into a main medium.

In FIG. 1 an arrangement 1 for introducing a gas into a main medium is shown. The arrangement comprises a reservoir 3 for containing the main medium, an apparatus 2 for introducing the gas into the main medium and an ejector 4 that is situated within the reservoir 3. As indicated by an arrow, via a first line 6 and a pump 5 a part of the main medium may be extracted from the reservoir 3. This part of the main medium may be guided to an apparatus inlet 22 of the apparatus 2. That is, the apparatus 2 is connected to the reservoir 3 such that at least a part of the main medium may be guided from the reservoir 3 to the apparatus 2. As also indicated by an arrow, the gas may be provided to the apparatus 2 via a third line 8. After the gas has been introduced into the main medium within the apparatus 2, the obtained mixture can be guided from an apparatus outlet 23 to an ejector inlet 20 of the ejector 4 via a second line 7. That is, the apparatus 2 is connected to the ejector 4 in such a way that a mixture of the main medium and the gas obtained with the apparatus 2 may be introduced into the reservoir 3 via the ejector 4 as indicated by arrows.

The ejector 4 further comprises an ejector intake 19 for sucking in main medium from the reservoir 3. Also, the ejector comprises a mixing chamber 24 that is connected to the ejector intake 19, the ejector inlet 20 and an ejector outlet 21. This way, the ejector 4 may act as a jet pump and suck in the main medium from the reservoir 3 via the ejector intake 19 by means of the mixture obtained by the apparatus 2 as a driving medium.

The reservoir 3 is an aeration tank for treating waste water as the main medium. The main medium is a suspension, in particular waste water and/or activated sludge. The gas comprises at least one of the following: air, oxygen, carbon dioxide, nitrogen, ozone.

Figure 2:
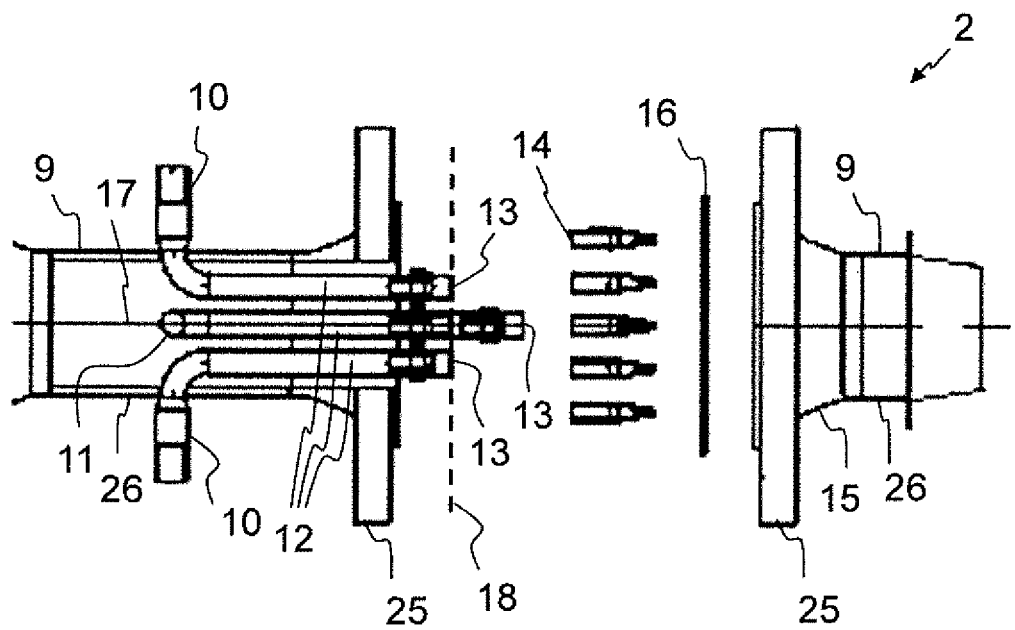
FIG. 2 is an explosion view of an apparatus for introducing gas into a main medium that may be used in the arrangement of FIG. 1.

FIG. 2 shows an explosion view of the apparatus 2 from FIG. 1. The apparatus 2 comprises a main conduit 9 for guiding the main medium and five injection lines 10, 11 for guiding the gas, wherein only three injection lines 10, 11 are visible. Each of the injection lines 10, 11 has a respective end section 12 with a respective outlet opening 13 and a respective nozzle tip 14 situated within the main conduit 9. The outlet openings 13 of the outer injection lines 10 are arranged in a plane 18 perpendicular to the main conduit 9. The end sections 12 are oriented parallel to each other and to the main conduit 9. One of the injection lines is an inner injection line 11 and the remaining injection lines are outer injection lines 10. The out let opening 13 of the inner injection line 11 is arranged downstream of the outlet openings 13 of the outer injection lines 10. The main medium preferably flows from left to right in the drawing. The gas may be ejected from the introduction lines 10, 11 such that in the drawing the gas flows from the left to the right. The main conduit 9 comprises a narrowing 15 downstream of the outlet openings 13 of all the injection lines 10, 11. Further, it may be seen that the main conduit 9 is composed of a multitude of elements, such as tube elements 26, flanges 25 and a seal 16. Also, an axis 17 of the main conduit 9 is indicated.

Figure 3:
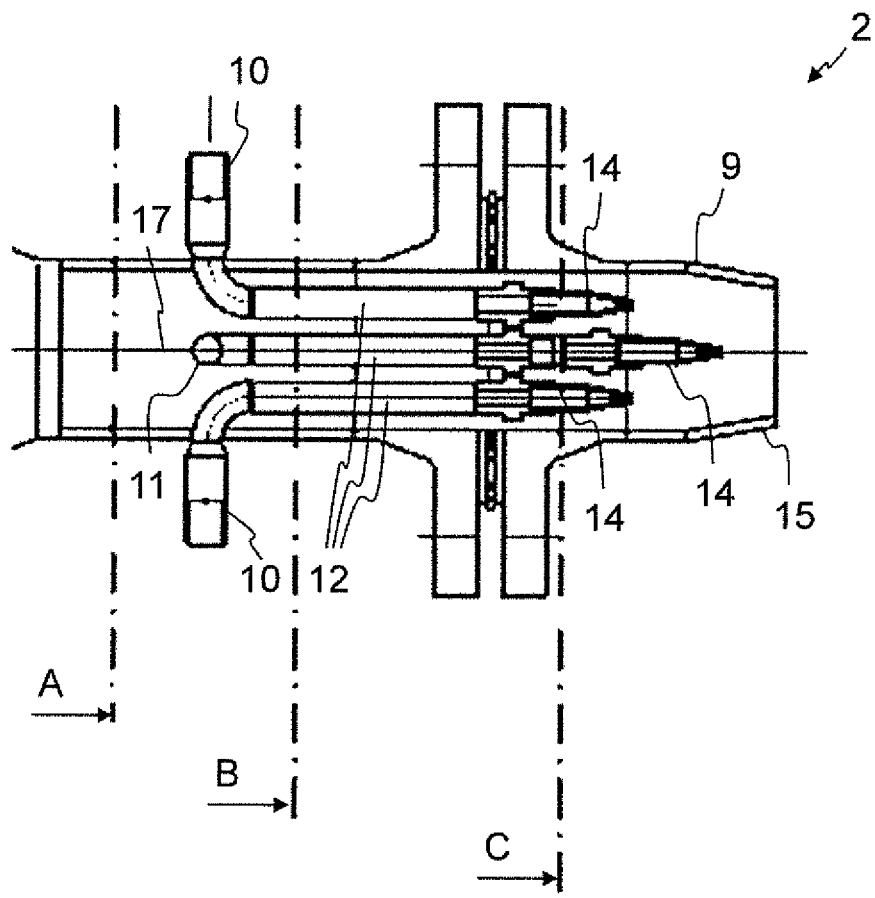
FIG. 3 is a view of the apparatus of FIG. 2 in an assembled state.

FIG. 3 shows a view of the apparatus 2 of FIG. 2 in an assembled state. The description of FIG. 2 applies to FIG. 3 analogously.

Figure 4:
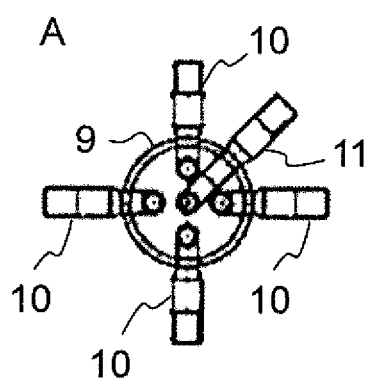
FIG. 4 is a cross sectional view of the apparatus of FIGS. 2 and 3.
Figure 5:
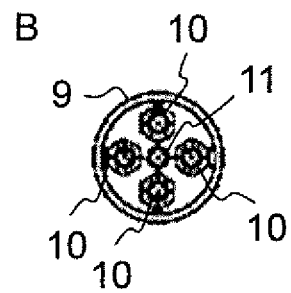
FIG. 5 is an another cross sectional view of the apparatus of FIGS. 2 and 3.
Figure 6:
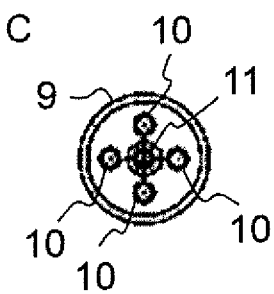
FIG. 6 is an another cross sectional view of the apparatus of FIGS. 2 and 3.

FIG. 4 to FIG. 6 show three cross sections A, B and C as indicated in FIG. 3. Each of FIG. 4 to FIG. 6 shows a cross section perpendicular to the main conduit 9. It may be seen that the end sections 12 of the injection lines 10, 11 are arranged on concentric circles. In the shown embodiments, the end section 12 of the inner introduction line 11 is arranged in a center of a single further circle on which the end sections of the four outer introduction lines 10 are arranged. The end sections 12 of the outer injection lines 10 are equally spaced apart from each other in a circumferential direction and radially spaced apart from the end section 12 of the inner injection line 11.

Figure 7:
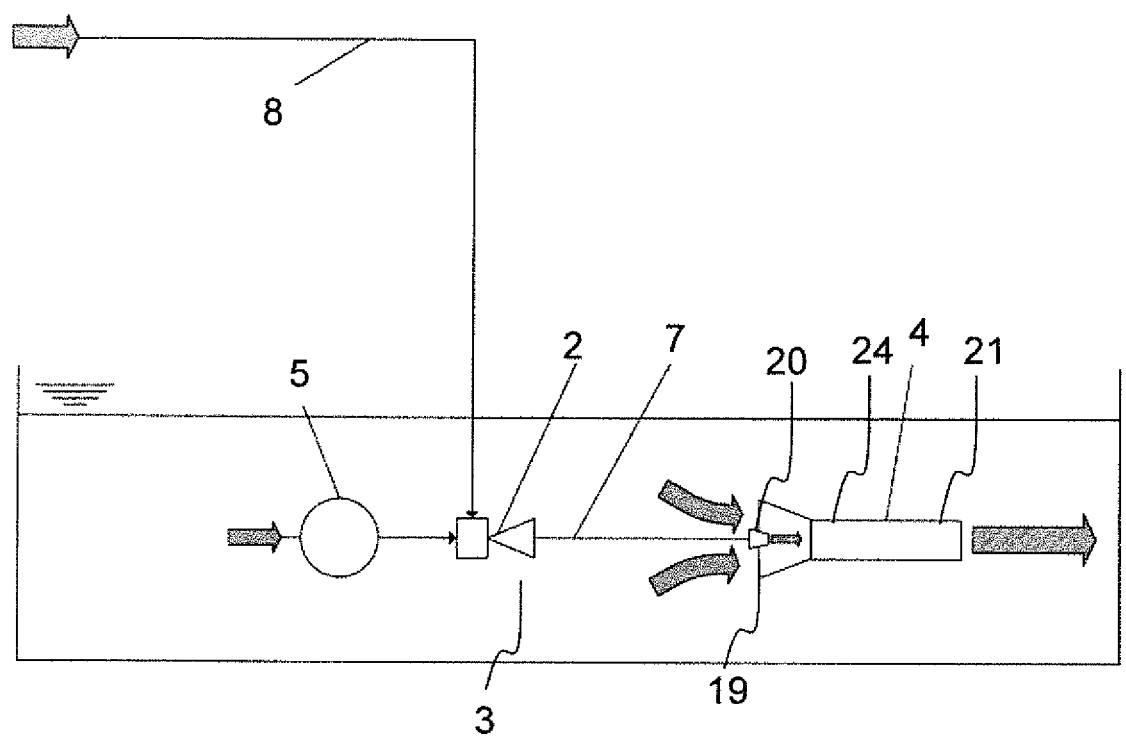
FIG. 7 is a schematic depiction of a second example of an arrangement for introducing gas into a main medium.

FIG. 7 displays a second example of an arrangement for introducing gas into a main medium. Reference is made to the example shown in FIG. 1 and the respective description. In the following description, only the differences compared to the first example will be discussed. In comparison to the first example, in this second example of an arrangement 1 for introducing a gas into a main medium, the pump 5 and apparatus 2 for introducing the gas into the main medium are submersed in the reservoir 3. This is advantageous in particular for situations with limited space as it is not necessary to provide for the pump 5 outside the reservoir 3 and the respective tubing.

With the apparatus 2 a gas may be introduced in particular into waste water for obtaining a biologically activated sludge. Thereby, interaction between the gas and the waste water may be particularly pronounced due to a particularly large liquid-gas-interface caused by particularly extensive turbulences. Further, shear avoids damage of the biological particles.

LIST OF REFERENCE NUMERALS

1 Arrangement
2 Apparatus
3 Reservoir
4 Ejector
5 Pump
6 first line
7 second line
8 third line
9 main conduit
10 outer injection line
11 inner injection line
12 end section
13 outlet opening
14 nozzle tip
15 narrowing
16 seal
17 axis
18 plane
19 ejector intake
20 ejector inlet
21 ejector outlet
22 apparatus inlet
23 apparatus outlet
24 mixing chamber
25 flange
26 tube element It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. An apparatus for introducing a gas into a main medium, the apparatus comprising:
   a main conduit configured and adapted to guide the main medium; and
   a multitude of injection lines configured and adapted to guide the gas, wherein each of the injection lines has a respective end section with a respective outlet opening situated within the main conduit, wherein the outlet opening of the inner injection line (11) is arranged downstream of the outlet openings of the outer injection lines, and wherein the end sections are oriented essentially parallel to each other and to the main conduit.

2. The apparatus of claim 1, wherein, in a cross section perpendicular to the main conduit, the end sections of the injection lines are arranged on concentric circles.

3. The apparatus of claim 2, wherein one of the injection lines is an inner injection line and the remaining injection lines are outer injection lines, wherein the end sections of the outer injection lines are radially spaced apart from the end section of the inner injection line.

4. The apparatus of claim 3, wherein the end sections of the outer injection lines are equally spaced apart from each other in a circumferential direction.

5. The apparatus of claim 3, wherein outlet openings of the outer injection lines are arranged in a plane perpendicular to a main conduit.

6. The apparatus of claim 1, wherein the main conduit comprises a narrowing downstream of the outlet opening of all the injection lines.

7. The apparatus of claim 1, wherein a respective nozzle tip is provided at the outlet opening of each injection line.

8. A system for introducing a gas into a main medium, the system comprising:
   a reservoir configured and adapted to contain the main medium;
   an apparatus of claim 1, wherein the main medium is pumped thereto; and
   an ejector that is placed within the reservoir, wherein the apparatus is connected to the ejector such that a mixture of the main medium and the gas obtained with the apparatus is introduced into the reservoir via the ejector.

9. The system of claim 8, wherein the ejector comprises:
   an ejector intake configured and adapted to suck in the main medium from the reservoir;
   an ejector inlet that is connected to an apparatus outlet of the apparatus; and
   a mixing chamber, connected to the ejector intake, the ejector inlet and an ejector outlet.

10. The system of claim 8, wherein the reservoir is an aeration tank configured and adapted to treat waste water as the main medium.

11. The system of claim 8, wherein the main medium is a suspension.

12. The system of claim 8, wherein the main medium is wastewater, activated sludge or combination thereof.

13. The system of claim 8, wherein the gas is selected from air, oxygen, carbon dioxide, nitrogen, ozone, or combinations thereof.

14. A method for introducing a gas into a main medium, the method comprising the steps of:
- pumping a part of the main medium from a reservoir to an apparatus;
- providing the gas to the apparatus to form a mixture of the main medium and the gas therein as a driving medium; and
- injecting the driving medium into the main medium in the reservoir, wherein the step of injecting the driving medium into the main medium includes the steps of
- introducing the driving medium to an ejector;
- sucking in the main medium from the reservoir to the ejector; and
- mixing the driving medium and the main medium in the ejector.

15. The method of claim 14, wherein the main medium is a suspension.

16. The method of claim 14, wherein the main medium is wastewater, activated sludge or combination thereof.

17. The method of claim 14, wherein the gas is selected from air, oxygen, carbon dioxide, nitrogen, ozone, or combinations thereof.

18. The method of claim 14, wherein the reservoir is an aeration tank configured and adapted to treat waste water as the main medium.

\* \* \* \* \*